United States Patent
Kim

(10) Patent No.: US 7,421,150 B2
(45) Date of Patent: Sep. 2, 2008

(54) COORDINATE CONVERSION APPARATUS AND METHOD

(75) Inventor: Dae Joong Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 715 days.

(21) Appl. No.: 11/036,037

(22) Filed: Jan. 18, 2005

(65) Prior Publication Data
US 2005/0157947 A1    Jul. 21, 2005

(30) Foreign Application Priority Data
Jan. 17, 2004 (KR) .................. 10-2004-0003530

(51) Int. Cl.
*G06K 9/32* (2006.01)
(52) U.S. Cl. ..................................... 382/293
(58) Field of Classification Search ......... 382/298–300, 382/293; 348/441–448, 458–459, 555–558, 348/701–704, 708
See application file for complete search history.

(56) References Cited

U.S. PATENT DOCUMENTS

| | | | |
|---|---|---|---|
| 5,790,714 A | * | 8/1998 | McNeil et al. ............... 382/300 |
| 5,835,150 A | | 11/1998 | Choi |
| 5,835,160 A | | 11/1998 | Chen et al. |
| 6,151,425 A | * | 11/2000 | Wakisawa et al. ............ 382/298 |
| 6,229,574 B1 | * | 5/2001 | Han ............................. 348/555 |
| 6,388,711 B1 | * | 5/2002 | Han et al. .................... 348/441 |

FOREIGN PATENT DOCUMENTS

JP        7-160906 A    6/1995

* cited by examiner

Primary Examiner—Ishrat Sherali
(74) Attorney, Agent, or Firm—Birch, Stewart, Kolasch & Birch, LLP

(57) ABSTRACT

Provided is a coordinate conversion apparatus and method capable of removing an accumulation position error when output pixel coordinates are obtained from input image coordinates by using an inverse-mapping technique. In the coordinate conversion apparatus, an output-size register for storing a size of an outputted image, and an input-size register stores a size of an image inputted from an outside. An adder adds, among a quotient and a remainder from dividing the size of the image stored in the input-size register by the size of the image stored in the output-size register, the remainder to the size of the image stored in the input-size register. An accumulation register stores the added value calculated by the adder. A decode logic unit obtains a position between input samples from which an output pixel is re-sampled, by comparing an output value of the accumulation register with an output value of the output-size register.

19 Claims, 5 Drawing Sheets

COORDINATE CONVERSION APPARATUS AND METHOD

This application claims the benefit of the Korean Patent Application No. P2004-0003530, filed on Jan. 17, 2004, which is hereby incorporated by reference.

BACKGROUND OF THE INVENTION

1. Field of the Invention

The present invention relates to an apparatus and method for coordinate conversion, and more particularly, to an apparatus and method for converting spatial resolution of a digital image by an inverse-mapping technique.

2. Discussion of the Related Art

There are various formats for expressing spatial resolution of an image, such as, a quarter common intermediate format (QCIF), a quarter video graphics array (QCIF) format, a source input format (SIF), a common intermediate format (CIF), a national television system committee (NTSC) format, a phase alternation line (PAL) format, a 480P format, a 720P format, a 1080I format, and the like, and a display device supports various-resolution outputs. Accordingly, so as to be able to display input images of various formats on a display device of fixed resolution, it is essential to convert spatial resolution of an input image.

In general, an inverse-mapping method, which re-maps coordinates of an output image to coordinates of an input image, is used for converting spatial resolution of an image.

FIG. 1 is a diagram illustrating a general inverse-mapping method.

Referring to FIG. 1, in case where an input image having a plurality of input image coordinates 2 is displayed by display devices of different formats, output image coordinates 4 are additionally generated by spatial resolution conversion according to a change in format.

At this time, since the output image coordinates 4 are mapped not to one input image coordinates 2 but to a plurality of input image coordinates 2, a pixel value of the output image coordinates 4 is determined by using pixel values of peripheral input image coordinates 2.

Here, the method of obtaining the output image coordinates mapped to the input image coordinates is called a re-sampling method. Also, the method of determining the pixel value of the output image coordinates by using the pixel values of the peripheral input image coordinates is called an interpolation method.

Accordingly, the necessary number of peripheral pixels is determined according to the interpolation method.

U.S. Pat. No. 5,835,150 titled as "Sampling rate conversion using digital differential analyzers" describes a method of performing the re-sampling and the interpolation by using digital differential analyzers (DDA), which is illustrated in FIG. 2 and will now be described with reference to FIG. 2.

Referring to FIG. 2, a DDA controller includes a 11-bit ratio register 10 for obtaining a 11-bit ratio through division of an input image size by an output image size and storing the obtained 11-bit ratio, a 12-bit adder 20, a 12-bit status register 30 for accumulating increment of the 11-bit ratio register 10 through addition by the 12-bit adder and storing the increment, and a decode logic unit 40 for controlling an FIR coefficient selection operation and an input shifting operation according to spatial resolution by using an accumulated image size outputted from the 12-bit status register 30.

In the above coordinate conversion method, spatial resolution is converted by using an accumulation value obtained by adding an increment value (11-bit ration register 10) and an accumulated value (12-bit status register 30) per output pixel.

As shown in FIG. 3, input samples are shifted by using an integer part of the accumulation value, a decimal part of the accumulation value denotes a position between the input samples, from which an output pixel should be re-sampled.

Here, the decimal part denotes "Sx" or "Sy" in FIG. 1, a coefficient of an interpolation filter is selected by using 2 digits below a decimal point.

In the above-stated inverse mapping method, output coordinates are increased by an I/O ratio of an input size to an output size. In general, the I/O ratio is not a finite value.

Although an increment value has a precision of $1/1024$, a re-sampling position error of $1/2048$ per output pixel is inevitably generated because the I/O ratio is not a finite value. An accumulation position error about the total output image is expressed by Equation 1 below.

[Equation 1]

$$\text{(accumulation position error)} = \text{(output image size)} \times (1/2048) \quad (1)$$

Such accumulation position error causes a deterioration of picture quality and disturbs (or prevents) sampling from being performed at an accurate sample position.

The accumulation position error is caused by storage of the increment value (i.e., the I/O ratio) in a finite-sized register. Accordingly, if the above problem is solved, a coordinate conversion device not having the accumulation position error may be embodied.

SUMMARY OF THE INVENTION

Accordingly, the present invention is directed to a coordinate conversion apparatus and method that substantially obviates one or more problems due to limitations and disadvantages of the related art.

An object of the present invention is to provide a coordinate conversion apparatus and method capable of removing an accumulation position error when output pixel coordinates is obtained from input image coordinates by using an inverse-mapping method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a coordinate conversion apparatus includes an input-size register for storing a size of an image inputted from an outside, an output-size register for storing a size of an outputted image, an adder adding, among a quotient and a remainder from dividing the size of the image stored in the input-size register by the size of the image stored in the output-size register, the remainder to the size of the image stored in the input-size register, an accumulation register storing the added value calculated by the adder, and a decode logic unit for obtaining a position between input samples from which an output pixel is re-sampled, by comparing an output value of the accumulation register with an output value of the output-size register.

The coordinate conversion apparatus may further include an initial value register for storing an initial value served as a criterion for determining a position of a first pixel of the output image.

The accumulation register may be initialized to the initial value.

The initial value may be used for interlaced/progressive conversion of an image or used for conversion of color difference value having a 4:2:0 ratio.

The decode logic unit may include a comparator for comparing a first output of the accumulation register with a second output of the output-size register, an accumulator for calculating a value of the position by accumulating the first output and the second output if the first output is smaller than the second output, and a controller for controlling an input shifting by accumulating the first output and the second output, when the first output is larger than or equal to the second output, and using the accumulation value.

An initial value register value may applied to the accumulation register, and the accumulation register may store an output value of the adder.

The decode logic unit may control a fractional distance and an input shifting by using an accumulation value and an output image size, which are required for interpolation.

The decimal value (F) may be obtained by dividing the accumulation value by the output image size.

The input-size register may be constructed to have a size of an input image.

In another aspect of the present invention, a coordinate conversion method includes the steps of temporarily storing a size of an image inputted from an outside in an input-size register and outputting the stored size, adding the output image size from the input-size register, only a remainder not a quotient of an image size, which is obtained by dividing an output value of an accumulator register by an image size stored in the output-size register, and an input image size, and accumulating the resulting addition value at an accumulation register, comparing an accumulated output image size from the accumulation register with an output image size outputted from an output-size register having a size of an output image, shifting input samples by repeatedly subtracting the output image size from the accumulated output image size until the accumulated output image size becomes smaller than the output image size, if the accumulated output image size is equal to or larger than the output image size, dividing the accumulated output image value by the output image size if the accumulated output image size is smaller than the output image size, and interpolating an output pixel by using the resulting division value (F).

The accumulation register may accumulate an initial value together with the resulting addition value, the initial value being served as a criterion for determining a position of a first pixel of the output image.

An initial register value accumulated at the accumulation register may be initialized to the initial value.

The initial value may be used for interlaced/progressive conversion of an image.

The resulting division value (F) may be a decimal value indicating a position between input samples, from which an output pixel is re-sampled.

The output pixel may be interpolated by using a fractional distance and an input shifting, which are the decimal value (F).

The coordinate conversion method may further include the step of adding an input size of an image outputted from the input-size register to the accumulated output image size and then repeating the preceding steps, unless the resulting division value (F) is completely calculated for all the output pixels.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
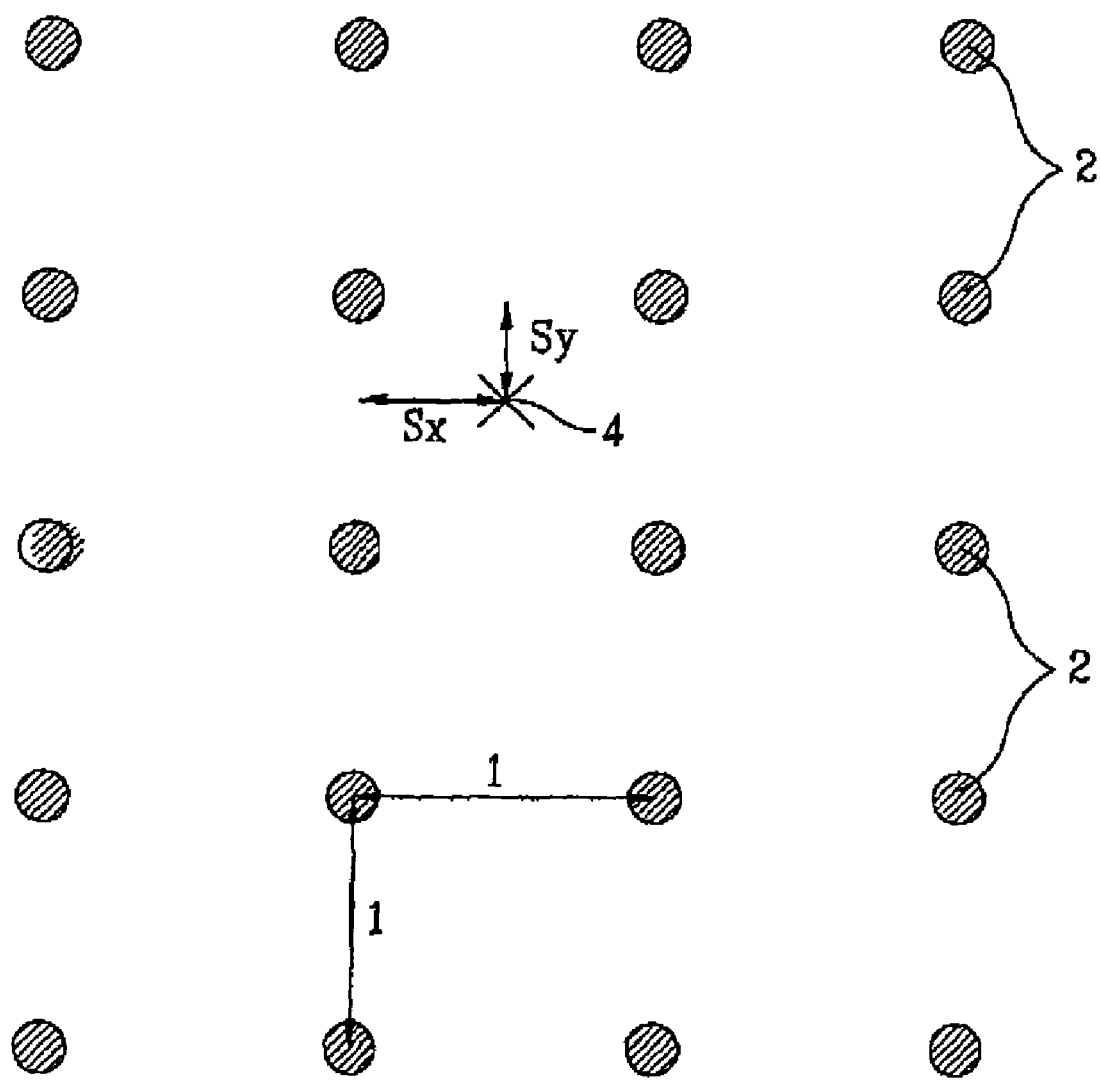
FIG. 1 is a diagram illustrating a general inverse-mapping method.
Figure 2:
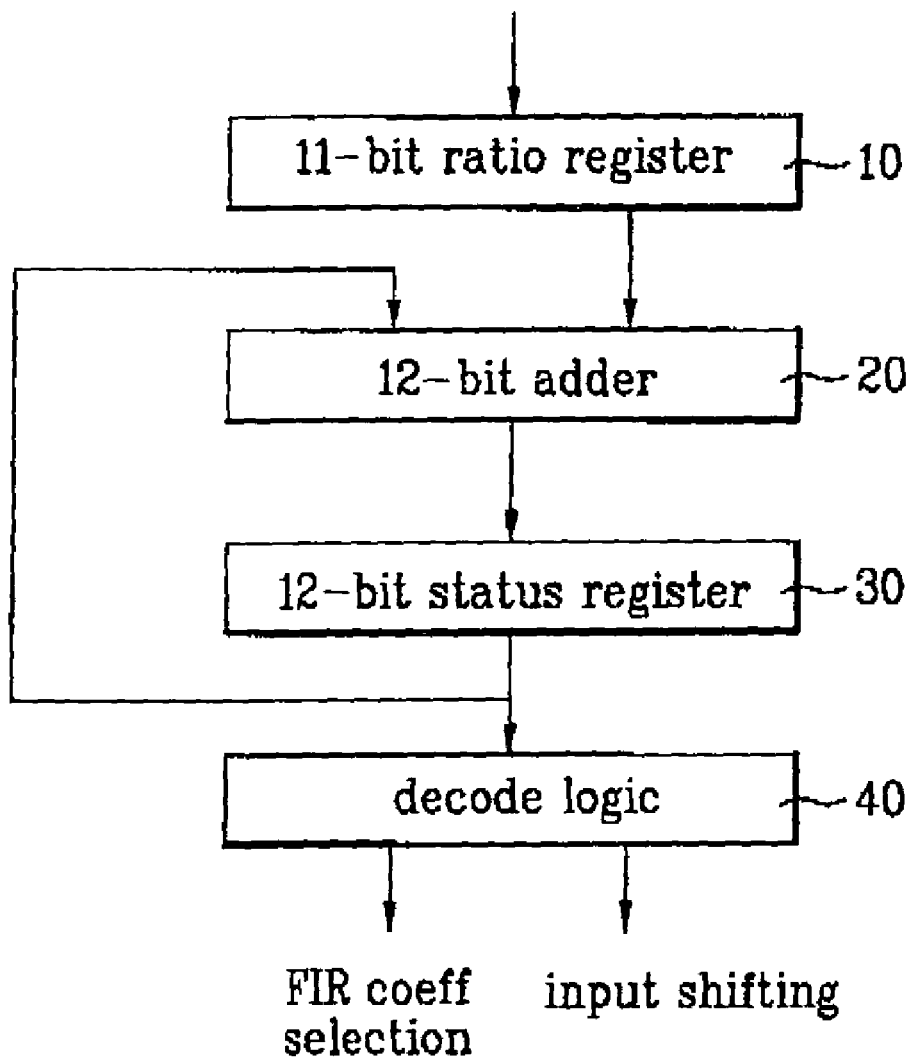
FIG. 2 is a block diagram of a conventional coordinate conversion device not having an accumulation position value.
Figure 3:
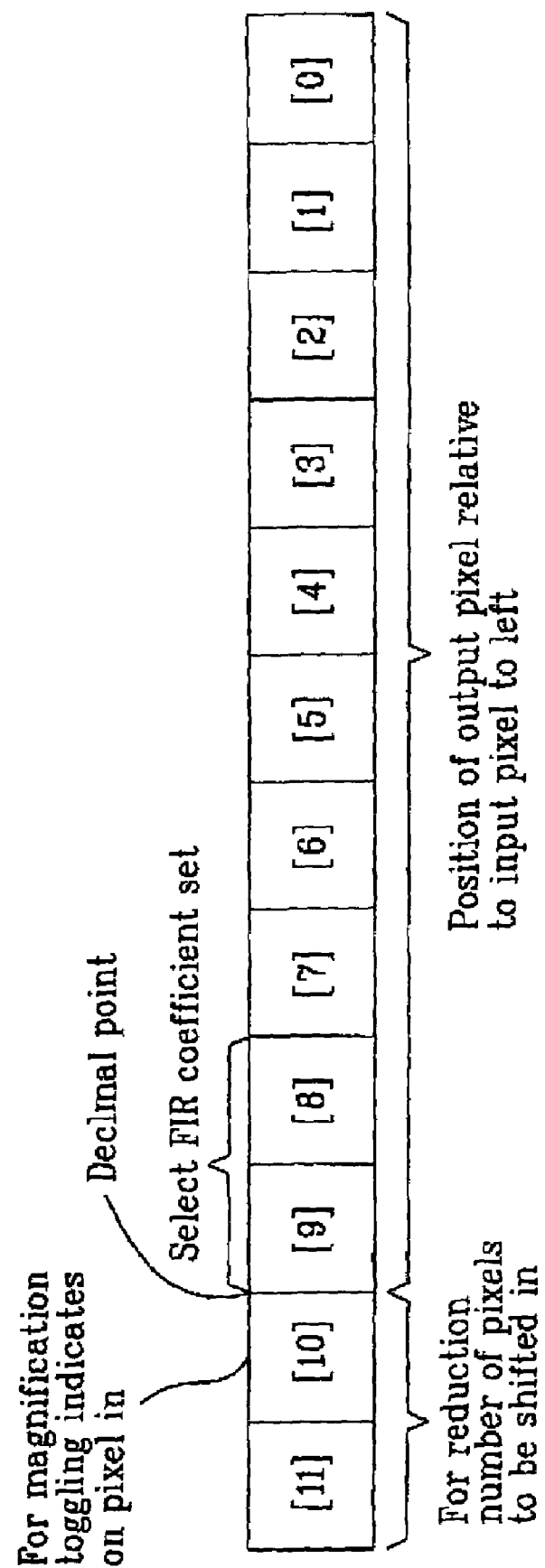
FIG. 3 is a diagram illustrating a structure of a state register shown in FIG. 2.
Figure 4:
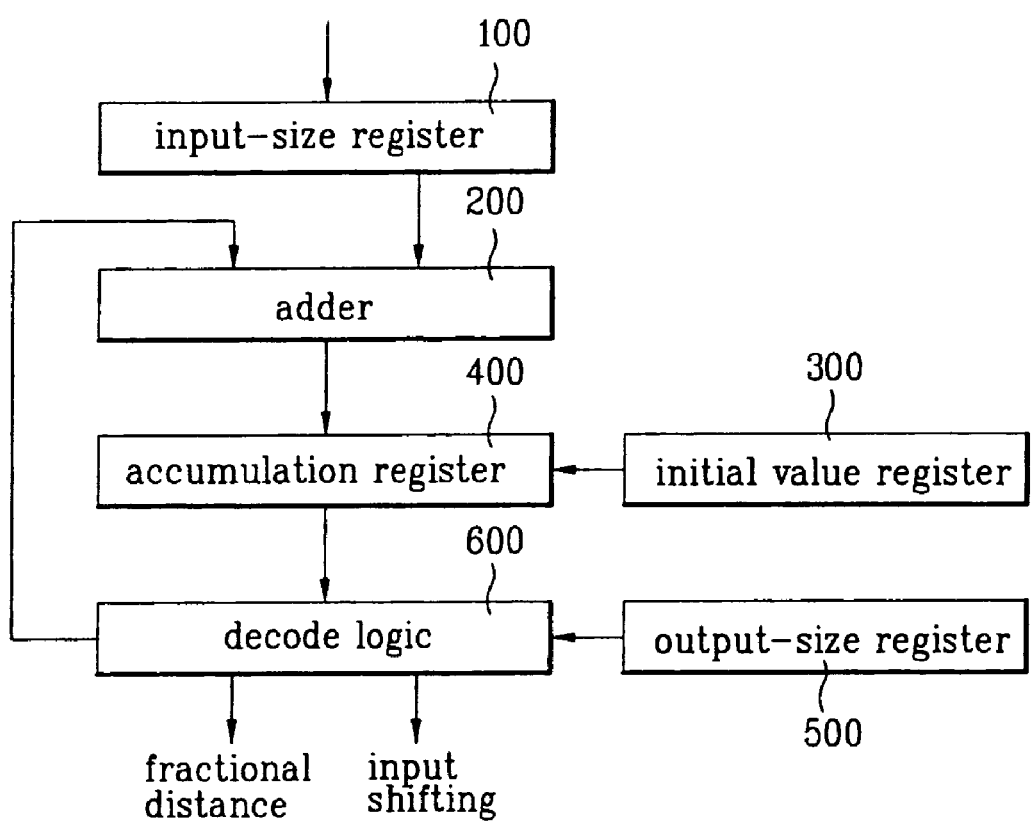
FIG. 4 is a block diagram of a coordinate conversion apparatus not having an accumulation position value according to an embodiment of the present invention.

FIG. 4 is a block diagram of a coordinate conversion apparatus not having an accumulation position value according to an embodiment of the present invention.

Referring to FIG. 4, the coordinate conversion apparatus includes an input-size register 100, an initial value register 300, an accumulation register 400, an adder 200, an output-size register 500 and a decoder (decode logic unit) 600. The input-size register 100 stores the size of an image inputted from the outside. The initial value register 300 stores an initial value served as a criterion for determining a position of the first pixel of an output image. The accumulation register 400 detects a sampling position in an input image grid by accumulating only remainders (not quotients) of the image size stored in the input-size register 100 by using the initial value stored in the initial value register 300. The adder 200 adds an output value of the input-size register 100 and an output value of the accumulation register 400 and outputs the resulting addition value to the accumulation register 400. The output-size register 500 stores a size of an output image. The decoder 600 obtains a decimal value denoting a position between input samples, from which an output pixel should be re-sampled, by comparing a size of an output image from the accumulation register with a size of an output image from the output-size register, and controls a fractional distance and an input shifting by interpolating an output pixel with the obtained decimal value.

At this time, the initial value stored in the initial value register 300 may be used for interlaced/progressive conversion of an image.

Also, the decode logic unit includes a comparator, an accumulator and a controller. The comparator compares a first output of the accumulation register with a second output of the output-size register. The accumulator calculates a value of the position by accumulating the first output and the second output if the first output is smaller than the second output. The controller controls a fractional distance and an input shifting by interpolating an output pixel with a decimal value of the calculated position value.

At this time, the decimal value (F) is obtained by Equation 2 below.

[Equation 2]

$$(\text{decimal value}(F)) = (\text{accumulation value})/(\text{output image size}) \quad (2)$$

Figure 5:
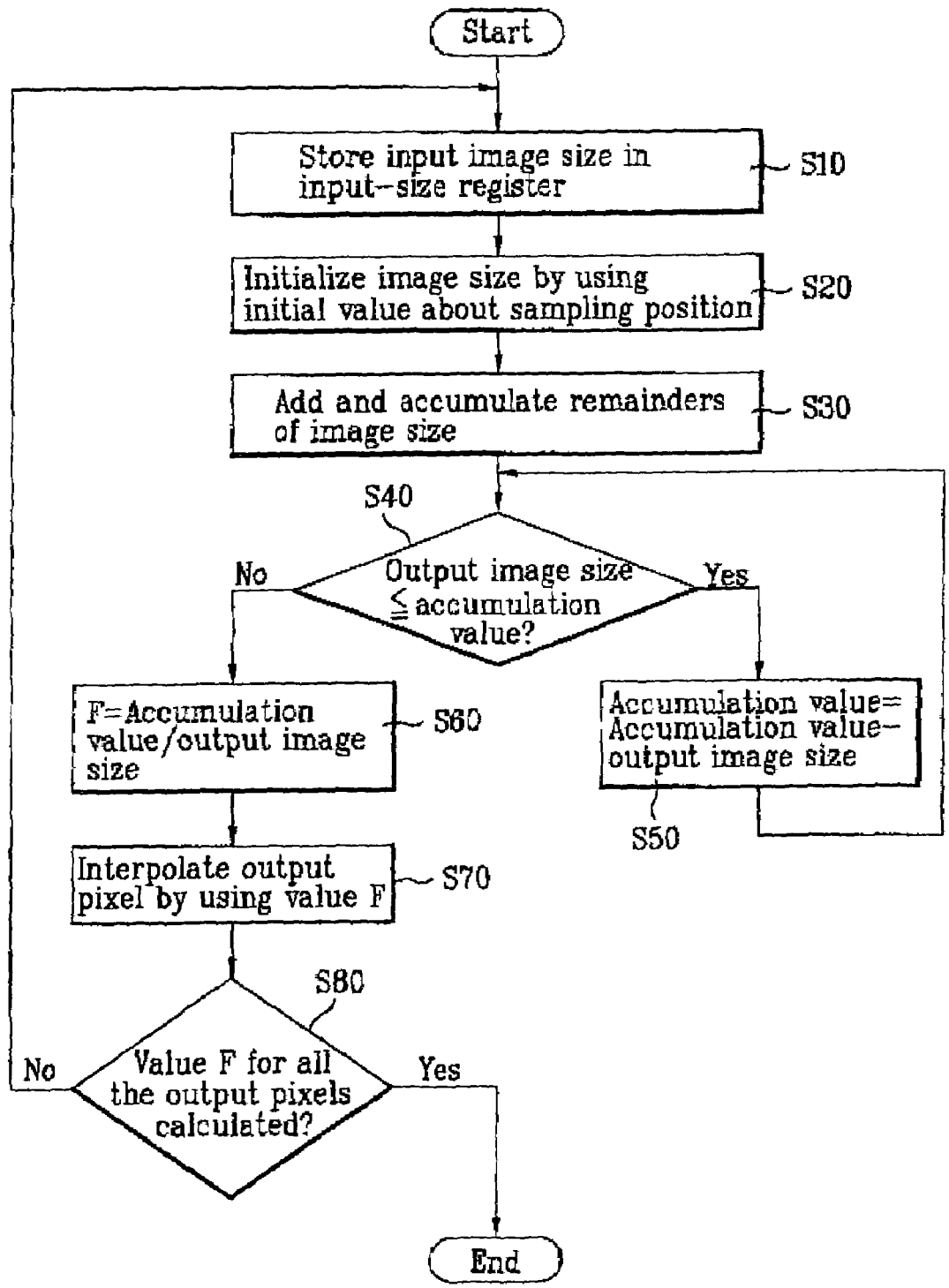
FIG. 5 is a flow diagram illustrating a coordinate conversion method not having an accumulation position value according to an embodiment of the present invention.

FIG. 5 is a flow diagram illustrating a coordinate conversion method not having an accumulation position value according to an embodiment of the present invention.

Referring to FIG. 5, the input-size register 100 temporarily stores a size of an image inputted from an outside and outputs the stored image size to the adder 200 (S10).

The accumulation register 400 initializes the image size outputted from the adder 200 by using an initial value stored in the initial value register 300 (S20).

Here, the initial value is a criterion for determining a position of a first pixel of an output image, and is used for interlaced/progressive conversion of an image.

The initialized image size is feedback to the adder 200. The adder 200 adds the imaged size received from the outside and the initialized image size, and outputs the resulting addition value to the accumulation register 400.

The accumulation register 400 stores an image size outputted from the adder 200 (S30).

At this time, the accumulation resister 400 accumulates only remainders (not quotients) of the output image size without using a value below a decimal point, and stores the resulting accumulation value.

Conventionally, an accumulation position error is more greatly generated because a decoded fractional distance is accumulated together with a given position error. However, in the present invention, the accumulation register 40 accumulates only the remainders of the output image size, thereby making it possible to remove the accumulation position error.

The decoder 600 compares an output image size from the output-size register 500 with the accumulated output image size from the accumulation register 400 (S40).

If an accumulation value (ACC) outputted from the accumulation register 400 is equal to or larger than an output size (M) outputted from the output-size register 500, input samples are shifted while subtracting the output size (M) from the accumulation value (ACC) until the accumulation value (ACC) becomes smaller than the output size (M) (S50).

In this manner, neighboring grids having a sampling position can be detected in input image grids.

Otherwise, if the accumulation value (ACC) is smaller than the output size (M), the accumulation value (ACC) is divided by the output size (M).

At this time, the resulting division value (F) becomes a decimal value indicating a position between input samples, from which an output pixel should be re-sampled (S60).

That is, after the neighboring grids are detected, the output pixel is interpolated by using the decimal value (F) (S70).

If the resulting division value (F) is not completely calculated for all the output pixels, the decoder 600 repeats the preceding steps by adding an input size (L) of an image outputted from the input-size register to the accumulation value (ACC) (S80).

The inventive coordinate conversion method can be expressed by a program language below.

```
x=0;
ACC=initial_value;
M=output_size;
L=input_size;
Do {
  do {
    ACC = ACC M;
    Shift One Input Sample;
  } while (ACC >= M)
  F = ACC/M;
  Interpolate Output Sample using F;
  x++;
  ACC = ACC + L;
} while (x<M)
```

In the present invention, the accumulation operation is performed by using only the remainders, whereby the accumulation position error is not generated.

As described above, the inventive coordinate conversion apparatus and method can prevent the accumulation position value, thereby making it possible to reduce a calculation amount required for mapping input image coordinates and to thus process an image rapidly. Also, the present invention can reduce hardware complexity, thereby making it possible to embody a low-price system.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A coordinate conversion apparatus comprising:
   an output-size register for storing a size of an outputted image;
   an input-size register for storing a size of an image inputted from an outside;
   an adder adding, among a quotient and a remainder from dividing the size of the image stored in the input-size register by the size of the image stored in the output-size register, the remainder to the size of the image stored in the input-size register;
   an accumulation register storing the added value calculated by the adder; and
   a decode logic unit for obtaining a position between input samples from which an output pixel is re-sampled, by comparing an output value of the accumulation register with an output value of the output-size register.

2. The apparatus of claim 1, further comprising an initial value register for storing an initial value served as a criterion for determining a position of a first pixel of the output image.

3. The apparatus of claim 2, wherein the accumulation register is initialized to the initial value.

4. The apparatus of claim 2, wherein the initial value is used for interlaced/progressive conversion of an image or is used for conversion of color difference value having a 4:2:0 ratio.

5. The apparatus of claim 1, wherein the decode logic unit comprises:
   a comparator for comparing a first output of the accumulation register with a second output of the output-size register;

an accumulator for calculating a value of the position by accumulating the first output and the second output if the first output is smaller than the second output; and a controller for controlling an input shifting by accumulating the first output and the second output, when the first output is larger than or equal to the second output, and using the accumulation value.

6. The apparatus of claim 1, wherein an initial value register value is applied to the accumulation register, and wherein the accumulation register stores an output value of the adder.

7. The apparatus of claim 1, wherein the decode logic unit controls a fractional distance and an input shifting by using an accumulation value and an output image size, which are required for interpolation.

8. The apparatus of claim 7, wherein the decimal value (F) is obtained by dividing the accumulation value by the output image size.

9. The apparatus of claim 1, wherein the input-size register is constructed to have a size of an input image.

10. The apparatus of claim 1, wherein the output-size register is constructed to have a size of an output image.

11. A coordinate conversion method comprising the steps of:

temporarily storing a size of an image inputted from an outside in an input-size register and outputting the stored size;

adding the output image size from the input-size register, only a remainder not a quotient of an image size, which is obtained by dividing an output value of an accumulator register by an image size stored in the output-size register, and an input image size, and accumulating the resulting addition value at an accumulation register;

comparing an accumulated output image size from the accumulation register with an output image size outputted from an output-size register having a size of an output image;

shifting input samples by repeatedly subtracting the output image size from the accumulated output image size until the accumulated output image size becomes smaller than the output image size, if the accumulated output image size is equal to or larger than the output image size;

dividing the accumulated output image value by the output image size if the accumulated output image size is smaller than the output image size; and interpolating an output pixel by using the resulting division value (F).

12. The method of claim 11, wherein the accumulation register accumulates an initial value together with the resulting addition value, the initial value being served as a criterion for determining a position of a first pixel of the output image.

13. The method of claim 12, wherein an initial register value accumulated at the accumulation register is initialized to the initial value.

14. The method of claim 12, wherein the initial value is used for interlaced/progressive conversion of an image.

15. The method of claim 11, wherein the resulting division value (F) is a decimal value indicating a position between input samples, from which an output pixel is re-sampled.

16. The method of claim 11, wherein the output pixel is interpolated by using a fractional distance and an input shifting, which are the decimal value (F).

17. The method of claim 16, wherein the decimal value (F) is obtained by dividing an accumulation value by an output image size.

18. The method of claim 11, further comprising the step of adding an input size of an image outputted from the input-size register to the accumulated output image size and then repeating the preceding steps, unless the resulting division value (F) is completely calculated for all the output pixels.

19. The method of claim 11, wherein the output pixel is formed by using neighboring input image pixels.

* * * * *